United States Patent
Herczku

(10) Patent No.: US 11,647,442 B2
(45) Date of Patent: May 9, 2023

(54) CENTRALIZED RAN CELL SECTOR CLUSTERING BASED ON CELL SECTOR PERFORMANCE

(71) Applicant: Verizon Patent and Licensing Inc., Basking Ridge, NJ (US)

(72) Inventor: Laszlo Herczku, Metuchen, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 156 days.

(21) Appl. No.: 17/155,511

(22) Filed: Jan. 22, 2021

(65) Prior Publication Data

US 2022/0240148 A1 Jul. 28, 2022

(51) Int. Cl.
| | |
|---|---|
| H04W 4/00 | (2018.01) |
| H04W 36/30 | (2009.01) |
| H04W 24/02 | (2009.01) |
| H04W 88/08 | (2009.01) |
| H04W 72/08 | (2009.01) |
| H04W 16/12 | (2009.01) |
| H04W 24/10 | (2009.01) |
| H04W 48/20 | (2009.01) |
| H04W 16/24 | (2009.01) |

(52) U.S. Cl.
CPC .......... *H04W 36/30* (2013.01); *H04W 16/12* (2013.01); *H04W 16/24* (2013.01); *H04W 24/02* (2013.01); *H04W 24/10* (2013.01); *H04W 48/20* (2013.01); *H04W 72/085* (2013.01); *H04W 88/085* (2013.01)

(58) Field of Classification Search
CPC ..... H04W 36/30; H04W 16/12; H04W 16/24; H04W 24/02; H04W 24/10; H04W 48/20; H04W 72/085; H04W 88/085
USPC .................................................. 370/330, 329
See application file for complete search history.

(56) References Cited

U.S. PATENT DOCUMENTS

| | | | |
|---|---|---|---|
| 9,125,047 B2 * | 9/2015 | Sundaresan | H04W 16/02 |
| 9,203,933 B1 * | 12/2015 | Akhter | H04L 69/04 |
| 9,467,819 B2 * | 10/2016 | Niu | H04L 5/0055 |
| 9,584,218 B2 * | 2/2017 | Lins De Medeiros | H04L 41/0645 |
| 10,231,264 B2 * | 3/2019 | Chatterjee | H04W 24/10 |
| 10,237,828 B2 * | 3/2019 | Park | H04W 52/0206 |
| 10,244,507 B2 * | 3/2019 | Tarlazzi | H04W 72/042 |
| 10,757,576 B2 * | 8/2020 | Ashrafi | H04L 41/0816 |
| 10,812,615 B2 * | 10/2020 | Shen | H04L 45/121 |
| 11,012,352 B2 * | 5/2021 | Kapela | H04W 8/082 |
| 11,240,686 B2 * | 2/2022 | Bapat | H04W 24/02 |
| 11,255,945 B2 * | 2/2022 | Markhovsky | G01S 19/05 |
| 11,363,678 B2 * | 6/2022 | Rosenschild | H04W 88/085 |

* cited by examiner

*Primary Examiner* — Amancio Gonzalez

(57) ABSTRACT

A process receives performance parameter measurements associated with multiple cell sectors of a group of multiple Remote Radio Units (RRUs) and determines a first set of cell sectors of the multiple cell sectors to include in a first cell sector cluster based on the measured performance parameters. The process configures connections, between the first set of cell sectors included in the first cell sector cluster and a first Baseband Unit (BBU) of multiple BBUs of a Centralized Radio Access Network (CRAN) hub, such that the first BBU processes traffic to and from the first set of cell sectors included in the first cell sector cluster.

20 Claims, 10 Drawing Sheets

CENTRALIZED RAN CELL SECTOR CLUSTERING BASED ON CELL SECTOR PERFORMANCE

BACKGROUND

Historically, Radio Access Networks (RANs) within a mobile network architecture have comprised standalone base stations that each include a baseband unit (BBU) and a Remote Radio Unit (RRU). The BBU of each base station is typically connected to its RRU via a front haul link, such as, for example, an optical fiber. A recent shift in RAN design, called Centralized RANs (CRANs), aggregates and centralizes baseband processing for a large number of distributed RRUs. In CRANs, a group of BBUs are co-located together and interconnected with the distributed RRUs via the fronthaul links. The use of CRANs offers various benefits such as baseband pooling, virtualization, smaller deployment footprint, and reduced power consumption.

DETAILED DESCRIPTION OF THE PREFERRED EMBODIMENTS

Figure 1A:
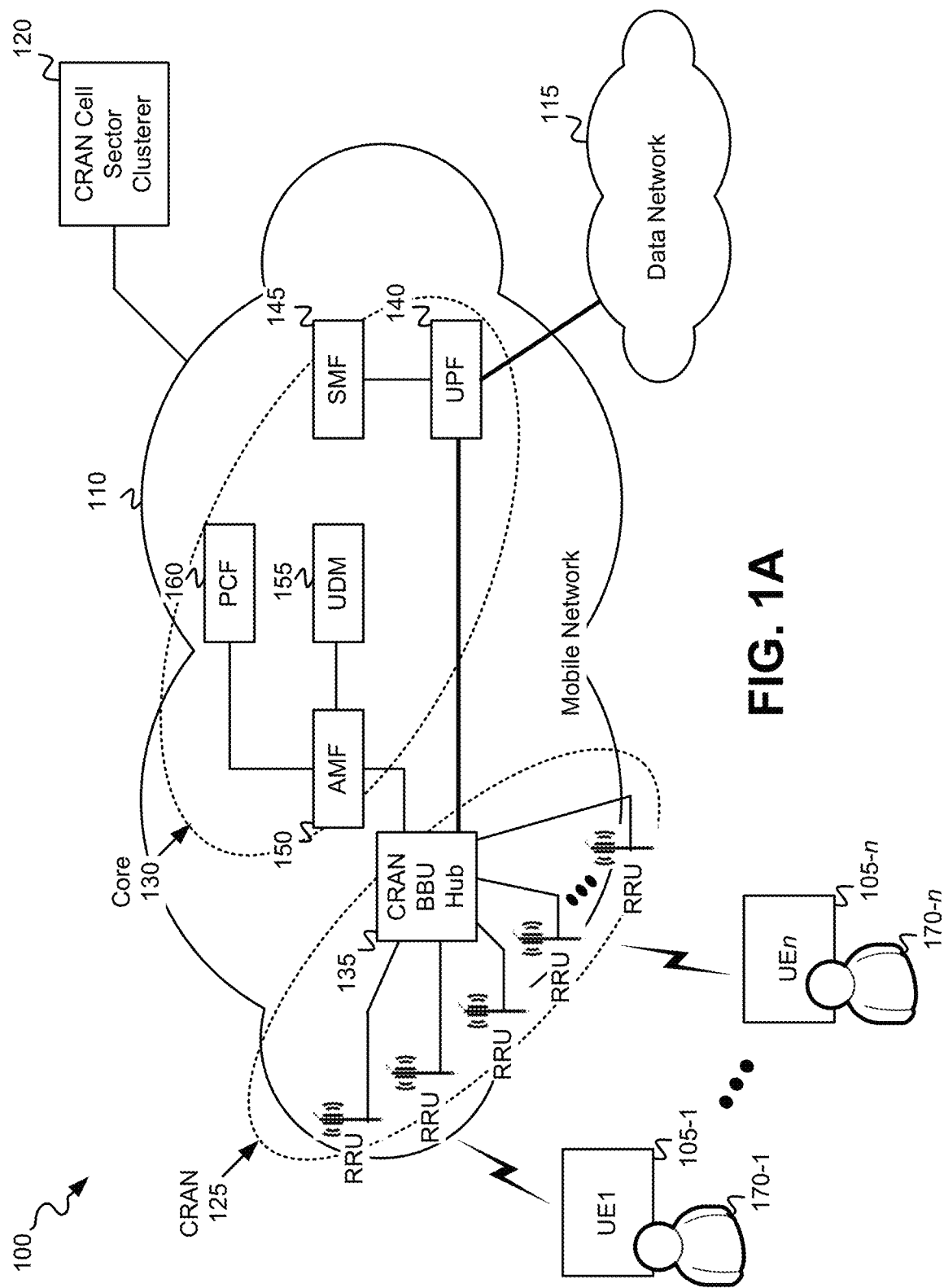
FIG. 1A depicts an exemplary network environment in which cell sectors of different Remote Radio Units within a centralized Radio Access Network (CRAN) may be clustered to reside on a same base band unit based on performance parameters of the cell sectors.

The following detailed description refers to the accompanying drawings. The same reference numbers in different drawings may identify the same or similar elements. The following detailed description does not limit the invention, which is defined by the claims.

The benefits to deploying a CRAN include reducing the equipment footprint at the cell site (i.e., at each RRU), while enabling more efficient network operations and the sharing of the centralized BBU resources within the CRAN BBU hub. CRAN's, thus, increase resource efficiency relative to mobile networks that do not utilize CRANs. Within mobile networks that include CRANs, such as, for example, Fourth Generation (4G) or Fifth Generation (5G) mobile networks, each base station typically includes a BBU paired with an RRU. The pairing of the BBU and the RRU usually involves assigning a base station identifier (ID) (e.g., a gNodeB ID in a 5G network) to the paired BBU and RRU such that there is a one-to-one relation between the BBU and the RRU. Therefore, traffic between a particular base station and the core of the mobile network is handled by the BBU and one of the cell sectors of the paired RRU to which the base station ID is assigned. Assignment of base station IDs to BBU and RRU pairs, however, can result in multi-BBU interactions and increased latencies for particular sessions or calls involving user equipment devices (UEs) that cross between cell sectors of different RRUs, where each of the RRUs are paired with a different BBU. For example, if a UE crosses from a first cell sector of a first RRU1, paired with a first BBU1 and assigned gNodeB ID #1, to a second cell sector of a second RRU2, paired with a second BBU2 and assigned gNodeB ID #2, then any traffic directed to the UE at gNodeB ID #1 will need to be rerouted from BBU1 to BBU2. The traffic can then be forwarded from BBU2 to the second cell sector of RRU2 for radio frequency (RF) transmission to the destination UE. In geographic areas having dense concentrations of RRUs (e.g., dense urban or suburban areas), and experiencing numerous UE handoffs between cell sectors of different RRUs as the UEs traverse those dense geographical areas, a significant amount of traffic rerouting between BBUs of the CRAN hub can occur, resulting in increased communication latencies associated with the mobile UEs being handed off from a first cell sector to a second cell sector.

Exemplary embodiments described herein configure CRANs in a more efficient manner such that rerouting of traffic between BBUs of the CRAN hub is reduced, resulting in decreased latencies and improved session/call performance. As described herein, performance parameters associated with cell sectors of multiple RRUs within a geographic area of the CRAN are determined. RF signal coverage boundaries of each cell sector of the multiple RRUs and capacity limitations of each of the BBUs in a CRAN hub servicing the multiple RRUs may also be determined. Cell sectors across multiple RRUs are then clustered in one or more cell sector clusters based on the cell sector performance parameters, the RF signal coverage boundaries, and the BBU capacity limitations.

In one implementation, the cell sector performance parameters may include cell sector-to-cell sector handoff rates, and cell sectors having higher rates of handoffs between them may be clustered into a single cell sector cluster, regardless of which RRU that each of the cell sectors is associated. As a simplified example, a first cell sector of a first RRU1 that has a high handoff rate with a second cell sector of a second RRU2 may be clustered in a same cell sector cluster. The cell sectors in the same cell sector cluster may then be assigned a same base station ID (e.g., gNodeB ID) and their connections reconfigured to connect to a single BBU within the CRAN hub for traffic handling by that BBU. As UEs are handed off between cell sectors in the cell sector cluster, rerouting of the traffic between different BBUs is eliminated due to a same BBU handling the traffic to/from the cell sectors of the cluster, even though the cell sectors may reside at different RRUs within the CRAN. Configuring/reconfiguring of the CRAN, as described herein, thus, improves network performance, such as improved latency, increased bandwidth, higher throughput, and higher utilization of BBUs in the CRAN hub, and results in RF coverage efficiency improvements in addition to the resource efficiency improvements introduced by incorporation of CRANs into the mobile network.

FIG. 1A depicts an exemplary network environment 100 in which cell sectors of different RRUs within a CRAN may be clustered to reside on a same BBU based on performance parameters of the cell sectors. As shown, network environment 100 may include user equipment devices (UEs) 105-1 through 105-n, a mobile network 110, a data network 115, and a CRAN cell sector clusterer 120.

UEs 105-1 through 105-n (referred to herein as a "UE 105" or "UEs 105") may each include any type of mobile electronic device having a wireless communication capability. UEs 105 may include, for example, a laptop, palmtop, wearable, or tablet computer; a cellular phone (e.g., a "smart" phone); a Voice over Internet Protocol (VoIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user/subscriber may carry, use, administer, and/or operate each UE 105. A user 170-1 is shown in association with UE 105-1 and a user 170-n is shown in association with UE 105-n.

Mobile network 110 may include any type of Public Land Mobile Network (PLMN) having a CRAN. As shown, mobile network 110 may include a CRAN 125 and a core network 130. CRAN 125 may include various types of radio access equipment that implements RF communication with UEs 105. The radio access equipment of CRAN 125 may include, for example, multiple RRUs and at least one CRAN BBU hub 135 (only a single CRAN BBU hub 135 is shown in FIG. 1A). Each of the RRUs includes a device(s) that operates as a radio function unit which transmits and receives RF signals to/from UEs 105.

CRAN BBU hub 135 (referred to herein as "BBU hub 135") includes multiple BBUs that are co-located together, usually in a same physical installation, and which interconnect with the distributed RRUs of CRAN 125 via fronthaul links or a fronthaul network. In some implementations, as described further with respect to FIG. 2 below, BBU hub 135 may interconnect with the distributed RRUs of CRAN 125 via a switch. CRAN 125 may additionally include other nodes, functions, and/or components not shown in FIG. 1A.

Core network 130 includes devices or nodes that perform functions needed for operating the mobile network 110 including, among other functions, mobile network access management, session management, and policy control. In the exemplary implementation of FIG. 1A, core network 130 is shown as including a 5G mobile network that further includes 5G network components, such as a User Plane Function (UPF) 140, a Session Management Function (SMF) 145, an Access and Mobility Management Function (AMF) 150, a Unified Data Management (UDM) function 155, and a Policy Control Function (PCF) 160.

UPF 140 includes, or is executed by, a network device that acts as a router and a gateway between mobile network 110 and data network 115, and forwards session data between data network 115 and CRAN 125. Though only a single UPF 140 is shown in FIG. 1, mobile network 110 may include multiple UPFs 140 at various geographic locations in network 110. SMF 145 includes, or is executed by, a network device that performs session management, allocates network addresses to UEs 105, and selects and controls UPFs 140 for data transfer. AMF 150 includes, or is executed by, a network device that performs authentication, authorization, and mobility management for UEs 105. UDM 155 includes, or is executed by, a network device that manages data for user access authorization, user registration, and data network profiles. UDM 155 may include, or operate in conjunction with, a User Data Repository (UDR—not shown) which stores user data, such as customer profile information, customer authentication information, and encryption keys for the information. PCF 160 includes, or is executed by, a network device that implements policy and charging control for service data flows and Protocol Data Unit (PDU) session related policy control.

Data network 115 may include one or more interconnected networks, such as local area networks (LANs), wide area networks (WANs), metropolitan area networks (MANs), and/or the Internet. Data network 115 connects with UPF 140 of core network 130 of mobile network 110.

CRAN cell sector clusterer 120 (referred to herein as "cell sector clusterer 120") includes one or more network devices that connect to mobile network 110 and obtain cell sector performance parameters (e.g., handoff occurrence rate data) and Radio Frequency (RF) signal coverage boundaries of cell sectors of each RRU, and cluster cell sectors of multiple different RRUs together for residing on a same BBU of BBU hub 135. Cell sector clusterer 120 may then initiate the reconfiguring of the connections between the RRU cell sectors and ports of the BBUs of BBU hub 135, and, if necessary, reconfiguring of internal routing of the BBUs of BBU hub 135 (e.g., routing from input port to output port), based on the clustering of the cell sectors from multiple RRUs.

In some implementations, cell sector clusterer 120 may include a virtual entity implemented by one or more devices within mobile network 110, such as an RRU(s) of CRAN 125, a device (not shown in FIG. 1A) associated with BBU hub 135, a device implementing AMF 150, a device implementing SMF 145, and/or a device implementing PCF 160.

The configuration of network components of network environment 100 is shown in FIG. 1A is for illustrative purposes. Other configurations may be implemented. Therefore, network environment 100 may include additional, fewer, and/or different components that may be configured in a different arrangement than that depicted in FIG. 1A. For example, though mobile network 110 is depicted in FIG. 1A as a 5G network with 5G network components/functions, mobile network 110 may alternatively include a 4G or 4.5G network with corresponding network components/functions, or a hybrid Next Generation/4G network that includes certain components of both a Next Generation network (e.g., a 5G network) and a 4G network. As another example, though cell sector clusterer 120 is shown in FIG. 1A as being connected to mobile network 110, in alternative implementations cell sector clusterer 120 may instead connect to data network 115.

Figure 1B:
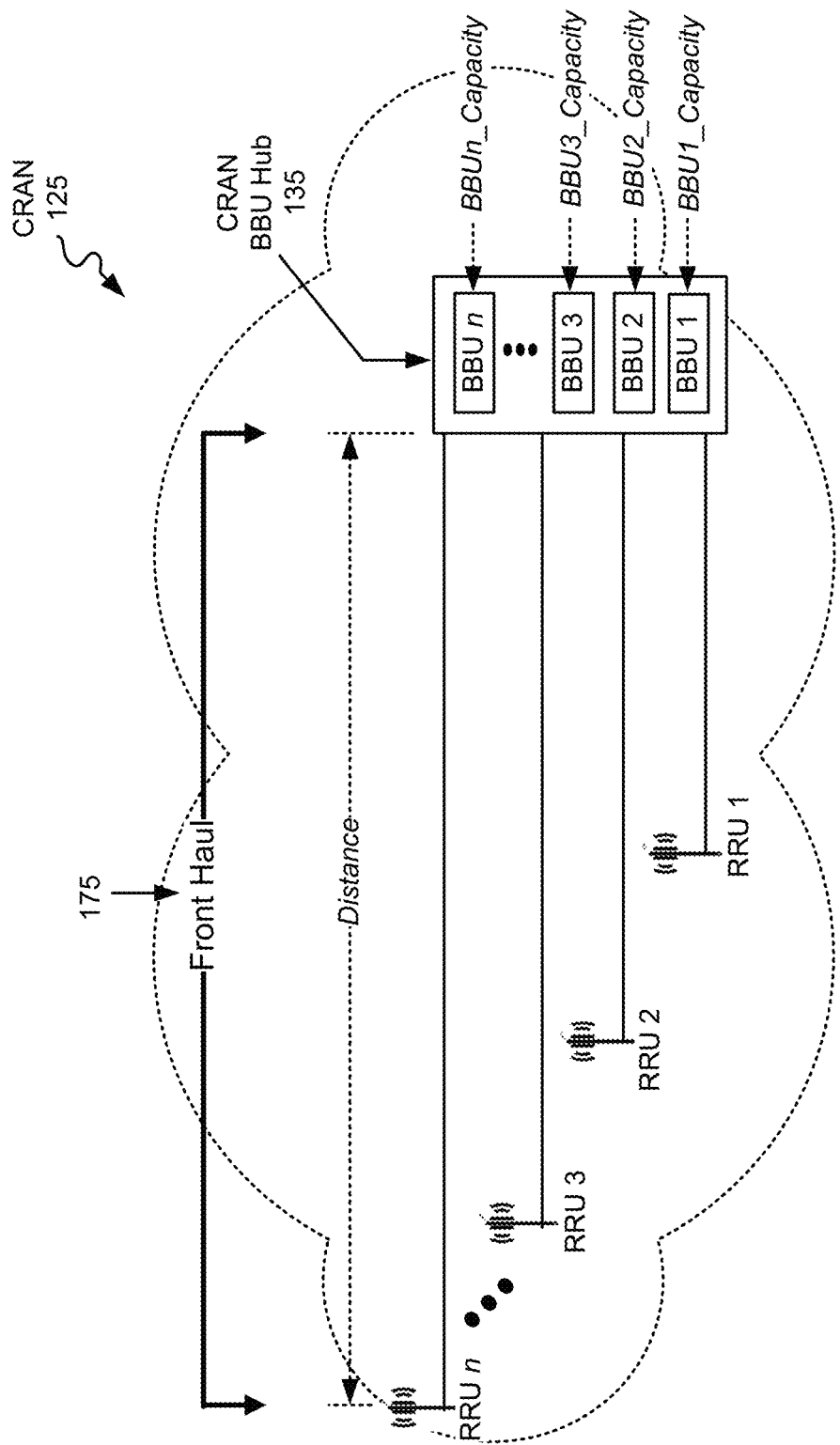
FIG. 1B illustrates an exemplary implementation of the centralized Radio Access Network of FIG. 1A.

FIG. 1B illustrates an exemplary implementation of CRAN 125. As shown, CRAN 125 may include multiple distributed RRUs connected to CRAN BBU hub 135 via a front haul 175. In the implementation of FIG. 1B, the front haul 175 may include multiple optical fibers that interconnect the RRUs (e.g., RRU 1 through RRU n) and the CRAN BBU hub 135. Each optical fiber that interconnects a RRU with CRAN BBU hub 135 may span what is referred to herein as a fiber distance. Different fiber distances may be associated with each RRU. The fiber distance associated with each RRU may affect communication performance between the BBUs of BBU hub 135. For example, RRU n is shown in FIG. 1B as having a greater fiber distance than RRU 1 and, therefore, may be associated with a greater communication latency.

As further shown, CRAN BBU hub 135 may include multiple BBUs (e.g., BBU 1 through BBU n), with each BBU capable of operating at a particular capacity (BBUx_ Capacity). Each BBU of BBU hub 135 includes, among other components, circuitry for processing downlink baseband signals from core network 130 to RRUs, and uplink baseband signals from RRUs to core network 130. Each BBU of BBU hub 135 may interconnect with, and communicate with, a particular cluster of cell sectors (not shown in FIG. 1B) using the cell sector clustering technique described herein. The capacity of each BBU (BBUx_Capacity) may include, for example, a maximum throughput capacity and/or bandwidth.

Figure 2:
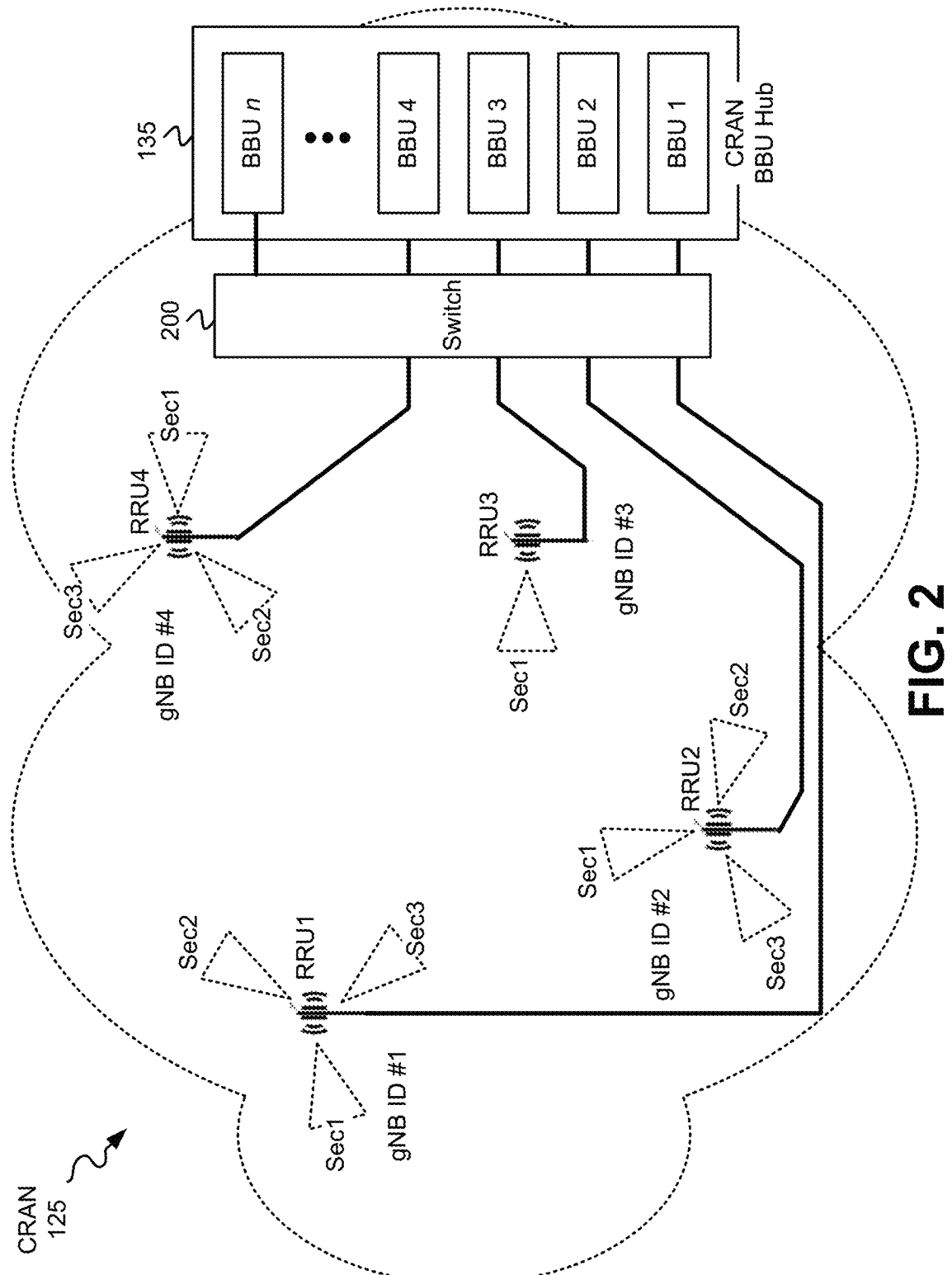
FIG. 2 depicts an example of a group of Remote Radio Units (RRUs), and their cell sectors, in the CRAN of FIG. 1A.

FIG. 2 depicts an example of a group of RRUs, and their cell sectors, in CRAN 125. The example group of RRUs includes RRU1, RRU2, RRU3 and RRU4. RRU1, RRU2 and RRU 4 each include three cell sectors (Sec1, Sec2, and Sec3), and RRU3 includes a single cell sector (Sec1). In the implementation shown, each of the RRUs may interconnect with a switch 200 via a front haul link or network. The switch 200, in turn, connects to BBU hub 135 and operates to switch particular sectors of the RRUs to particular BBUs of BBU hub 135. Switch 200, therefore, may reconfigure the interconnections between the sectors of each RRU and the ports of the BBUs of BBU hub 135 based on instructions from cell sector clusterer 120.

In implementations in which the front haul links between the RRUs and BBU hub 135 include optical links, switch 200 may include an optical switch such as, for example, a Reconfigurable Optical Add-Drop Multiplexer (ROADM). The ROADM may include any type of ROADM for multiplexing and demultiplexing data traffic carried via multiple optical carriers (e.g., multiple wavelengths) to/from the RRUs and the BBUs of BBU hub 135. The ROADM may include, for example, a Planar Lightwave Circuit (PLC), a Wavelength Selective Switch (WSS) or a Wavelength Crossconnect (WXC) ROADM. The ROADM may multiplex or demultiplex the data traffic via the multiple optical carrier optical signals based on instructions from cell sector clusterer 120 and/or from a device (not shown) associated with BBU hub 135.

Though the example group of RRUs shown in FIG. 2 includes RRUs with each having three or fewer cell sectors, in other implementations the RRUs may include different numbers of cell sectors. For example, in some implementations, a RRU may include one or more massive Multiple Input Multiple Output (MIMO) antenna arrays that produce an RF coverage area that forms numerous cell sectors.

Figure 3:
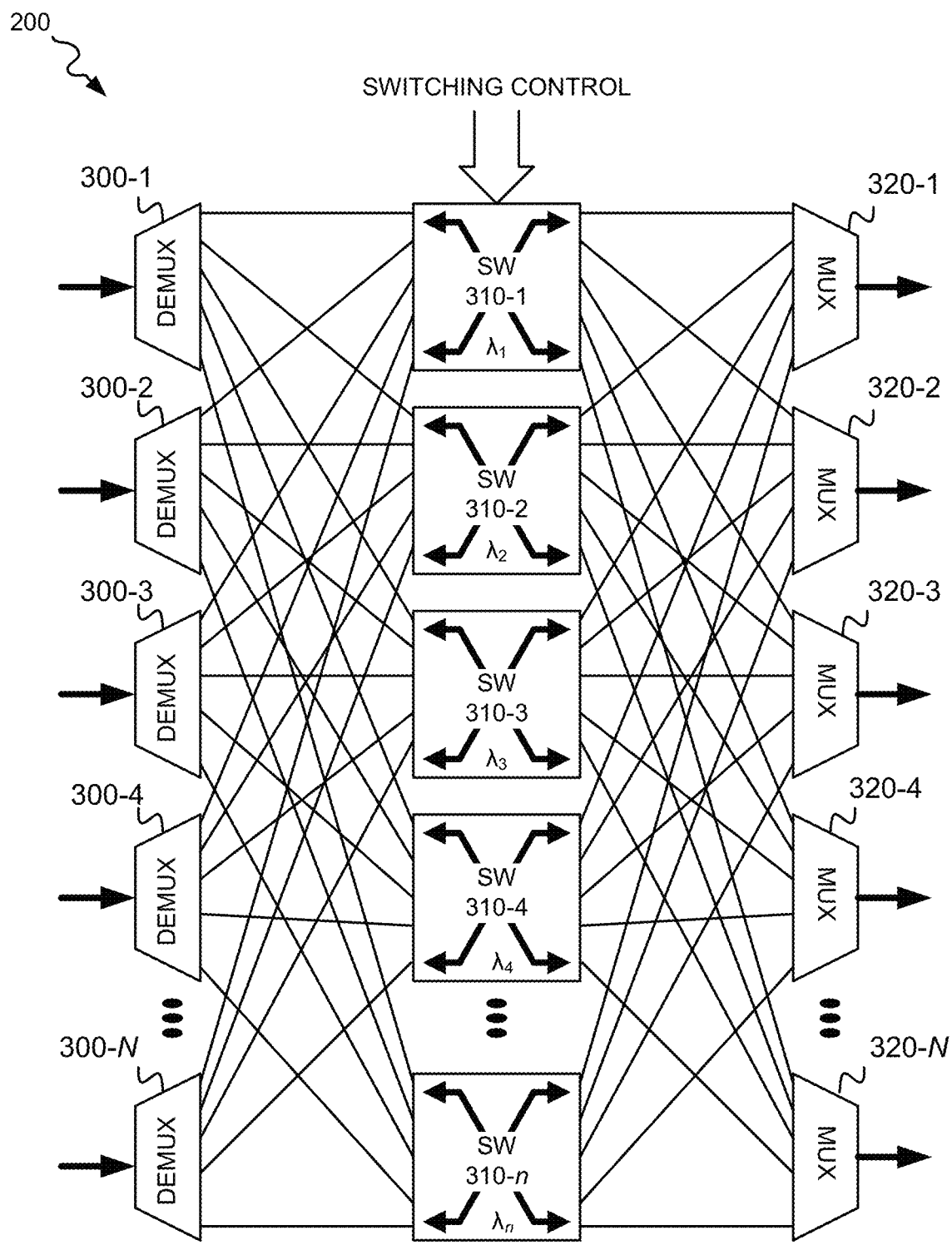
FIG. 3 depicts an exemplary implementation in which the switch of FIG. 2 includes a Reconfigurable Optical Add-Drop Multiplexer.

FIG. 3 depicts a switch 200 that includes a ROADM according to an exemplary implementation. In the exemplary implementation of FIG. 3, the ROADM includes a Wavelength Crossconnect (WXC) type of ROADM. In other implementations, the ROADM may include other types of ROADMs such as, for example, a Planar Lightwave Circuit (PLC) ROADM or a Wavelength Selective Switch (WSS) ROADM. The WXC type of ROADM depicted in FIG. 3 provides NxN connectivity. For a degree N–1 node and n wavelengths per fiber, the WXC type of ROADM uses N demultiplexers, N Multiplexers, and n NxN switches.

The ROADM may include multiple optical demultiplexers 300-1 through 300-N, multiple optical switches 310-1 through 310-n, and multiple optical multiplexers 320-1 through 320-N. Each of demultiplexers 300-1 through 300-N (generically referred to herein as a "demultiplexer 300") receive optical signals carried by multiple optical carriers (e.g., wavelengths $\lambda_1$ through $\lambda_n$) over an optical fiber (as depicted by the bold arrows at the left-hand side of FIG. 3). Demultiplexer 300 demultiplexes the multiple optical wavelengths into single output wavelengths and outputs each wavelength $\lambda$ to its respective switch among switches 310-1 through 310-n. For example, demultiplexer 300-1 demultiplexes optical signals on each of wavelengths $\lambda_1$ through $\lambda_n$ and sends optical signals for wavelength $\lambda_1$ to switch 310-1, optical signals for wavelength $\lambda_2$ to switch 310-2, etc.

Switches 310-1 through 310-n (generically and individually referred to herein as a "switch 310") may receive optical signals carried on a single optical wavelength from each of demultiplexers 300-1 through 300-N, and may switch the optical signals to one of multiplexers 320-1 through 320-N based on switching control instructions. Each switch 310 operates on a single optical wavelength and switches optical signals carried on that optical wavelength from any input port to any output port. For example, switch 310-1 may switch optical signals received on wavelength $\lambda_1$ from demultiplexer 300-1 to multiplexer 320-N for output on an optical fiber from the ROADM. As another example, switch 310-4 may switch optical signals received on wavelength $\lambda_4$ from demultiplexer 300-3 to multiplexer 320-1 for output on an optical fiber from the ROADM. Each of multiplexers 320-1 through 320-N (generically referred to herein as "multiplexer 320") may multiplex optical signals carried on one or more different wavelengths, received from switches 310-1 through 310-n, for output to an optical fiber.

The configuration of components of the ROADM illustrated in FIG. 3 is for illustrative purposes only. Other configurations may be implemented. Therefore, the ROADM may include additional, fewer and/or different components, or differently arranged components, than those depicted in FIG. 3. For example, the ROADM may alternatively include a PLC ROADM or a WSS ROADM.

Figure 4:
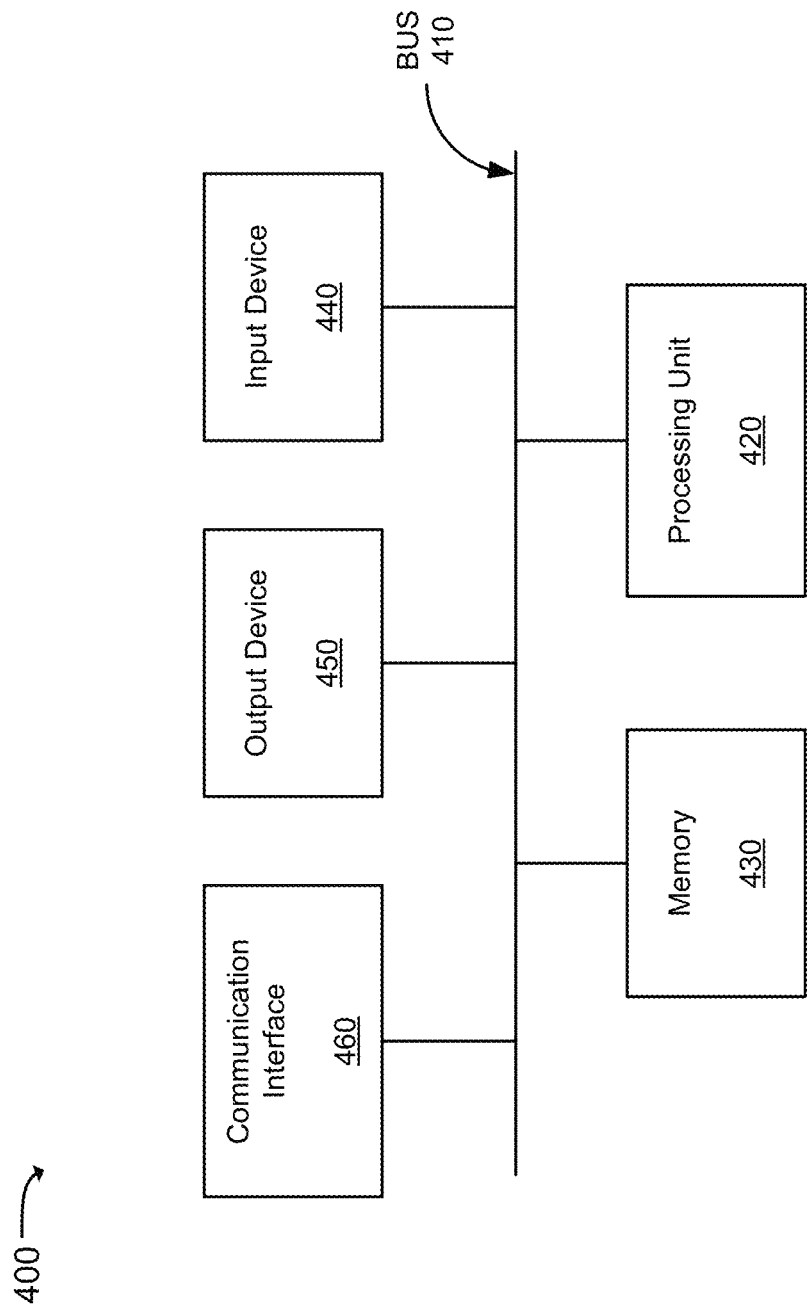
FIG. 4 is a diagram that depicts exemplary components of a device that may correspond to the User Equipment devices, the RRUs, the CRAN Baseband Unit (BBU) hub, the BBUs, and/or the CRAN cell sector clusterer of FIG. 1A.

FIG. 4 is a diagram that depicts exemplary components of a device 400. UEs 105, the RRUs of CRAN 125, BBU hub 135, the BBUs of BBU hub 135, and CRAN cell sector clusterer 120 may include the same, or similar, components to those of device 400 shown in FIG. 4. Further, each of the functions UPF 140, SMF 145, AMF 150, UDM 155 and PCF 160 of core network 130 may be implemented by a network device that includes components that are the same as, or similar to, those of device 400. Some of functions UPF 140, SMF 145, AMF 150, UDM 155 and PCF 160 may be implemented by a same device 400 within network 110, while others of the functions may be implemented by one or more separate devices 400 within network 110.

Device 400 may include a bus 410, a processing unit 420, a memory 430, an input device 440, an output device 450, and a communication interface 460. Bus 410 may include a path that permits communication among the components of device 400. Processing unit 420 may include one or more processors or microprocessors, or processing logic, which may interpret and execute instructions. Memory 430 may include one or more memory devices for storing data and instructions. Memory 430 may include a random access memory (RAM) or another type of dynamic storage device that may store information and instructions for execution by processing unit 420, a Read Only Memory (ROM) device or another type of static storage device that may store static information and instructions for use by processing unit 420, and/or a magnetic, optical, or flash memory recording and storage medium. The memory devices of memory 430 may each be referred to herein as a "tangible non-transitory computer-readable medium," "non-transitory computer-readable medium," or "non-transitory storage medium." In some implementations, the processes/methods set forth herein can be implemented as instructions that are stored in memory 430 for execution by processing unit 420.

Input device 440 may include one or more mechanisms that permit an operator to input information into device 400, such as, for example, a keypad or a keyboard, a display with a touch sensitive panel, voice recognition and/or biometric mechanisms, etc. Output device 450 may include one or more mechanisms that output information to the operator, including a display, a speaker, etc. Input device 440 and output device 450 may, in some implementations, be implemented as a user interface (UI) that displays UI information and which receives user input via the UI. Communication interface 460 may include a transceiver(s) that enables device 400 to communicate with other devices and/or systems. For example, communication interface 460 may include one or more wired and/or wireless transceivers for communicating via network 110 and/or data network 115. In the case of RRUs of CRAN 125, communication interface 460 may further include antenna arrays for producing RF cell sectors, such as shown in the example of FIG. 2.

The configuration of components of device 400 illustrated in FIG. 4 is for illustrative purposes. Other configurations may be implemented. Therefore, device 400 may include additional, fewer and/or different components than those depicted in FIG. 4.

Figure 5:
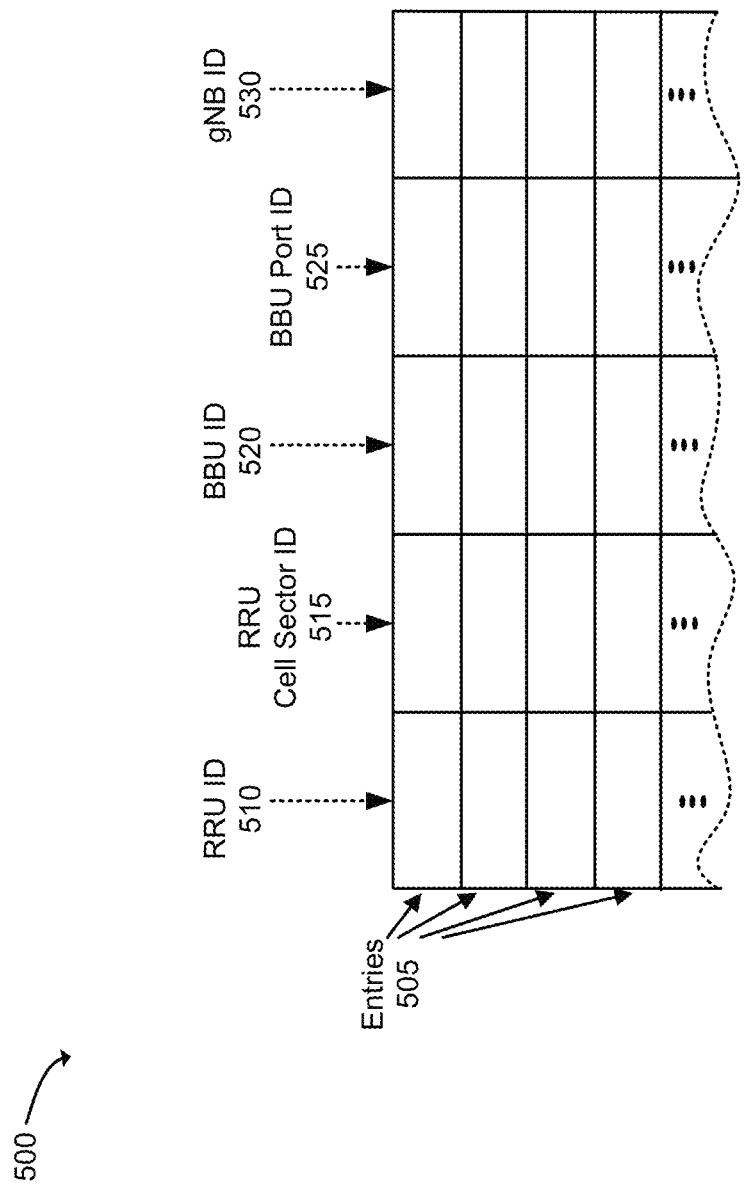
FIG. 5 depicts an exemplary implementation of a data structure that may be stored in a memory associated with the CRAN cell sector clusterer of FIG. 1A.

FIG. 5 depicts an exemplary implementation of a data structure 500 that may be stored in a memory associated with, for example, cell sector clusterer 120. As shown, the data structure may include multiple entries 505, with each entry 505 including, for example, a RRU identifier (ID) field 510, a RRU cell sector ID field 515, a BBU ID field 520, a BBU port ID field 525, and a gNodeB (gNB) ID field 530. Each entry 505 of data structure 500 maintains an updated mapping of RRU cell sectors to particular ports of particular BBUs and to base station IDs (e.g., gNB IDs). The fields of entries 505 of data structure 500 may be updated during execution of the process of FIG. 6 below.

RRU identifier ID field 510 stores a unique ID associated with a particular RRU in mobile network 110. RRU cell sector ID field 515 stores a unique ID associated with each cell sector of a particular RRU in mobile network 110. Each RRU in mobile network 110 may include one or more cells sectors, with each cell sector having its own unique ID.

BBU ID field 520 stores a unique ID associated with a particular BBU of BBU hub 135. Each different BBU of BBU hub 135 may have its own unique BBU ID. BBU port ID field 525 stores a unique ID associated with a particular port of a BBU of CRAN hub 135. Each BBU of the multiple BBUs of CRAN hub 135 may have multiple ports, and each of the multiple ports may connect to a particular RRU, or to a particular cell sector of a particular RRU of the RRUs of mobile network 110, via, for example, an optical fiber path. gNodeB (gNB) ID field 530 may store a unique ID associated with a cluster of cell sectors that have been clustered (e.g., by cell sector clusterer 120) together as a single gNB to have their traffic handled by a single BBU of the BBU hub 135.

To locate a particular entry 505, data structure 500 may be queried with particular data to locate an entry 505 having matching data stored in one of the fields 510, 515, 520, 525, and/or 530. When such an entry 505 is located, data may be stored in one or more fields of the entry 505, or data may be retrieved from one or more fields of the entry 505. For example, if a cell sector ID of a particular cell sector of a particular RRU is known, then the entries 505 of data structure 500 may be queried to locate an entry 505 having a matching RRU cell sector ID stored in field 515. In this example, upon location of the entry 505 with a matching field to the known cell sector ID, then the data stored in gNB ID field 530 of the entry 505 may be retrieved.

Data structure 500 of FIG. 4 is depicted as including a tabular data structure with a certain number of fields having certain content. The tabular data structure shown in FIG. 5, however, is for illustrative purposes. Other types of data structures may alternatively be used. The number, types, and content of the entries and/or fields in the data structures illustrated in FIG. 5 are also for illustrative purposes. Other data structures having different numbers of, types of and/or content of, the entries and/or the fields may be implemented. Therefore, the data structure 500 depicted in FIG. 5 may include additional, fewer and/or different entries and/or fields than those shown.

Figure 6:
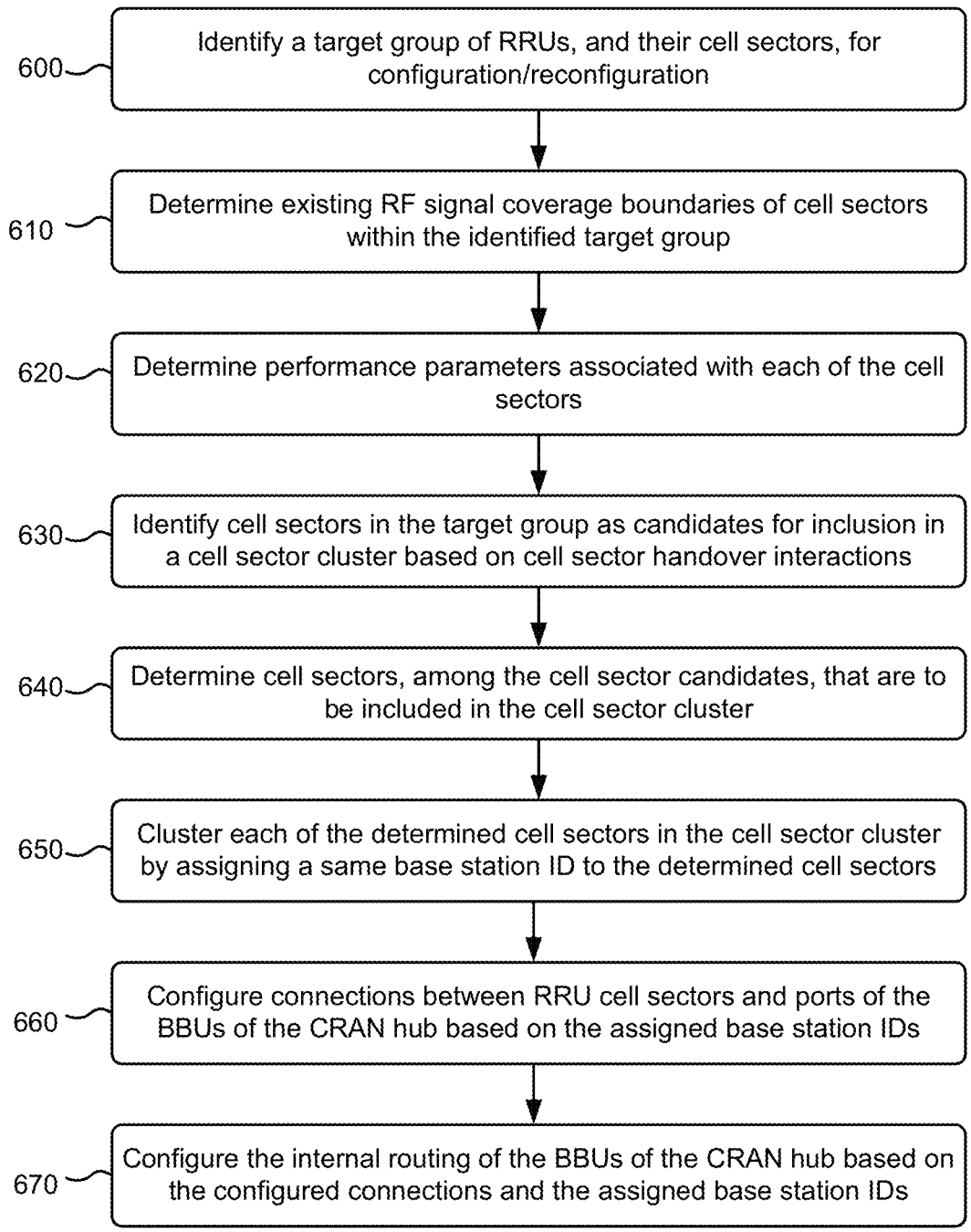
FIG. 6 is a flow diagram that illustrates an exemplary process for configuring or reconfiguring a CRAN such that cell sectors distributed across multiple different RRUs may be clustered together based on performance parameters associated with each of the cell sectors of the different RRUs.

FIG. 6 is a flow diagram that illustrates an exemplary process for configuring or reconfiguring a CRAN such that cell sectors distributed across multiple different RRUs may be clustered together and connected to, for traffic handling by, a same BBU of a CRAN BBU hub based on performance parameters associated with each of the cell sectors of the different RRUs. In one implementation, the exemplary process of FIG. 6 may be implemented by cell sector clusterer 120 in conjunction with CRAN BBU hub 135 and switch 200. In another implementation, the exemplary process of FIG. 6 may be performed manually, either entirely or in-part.

The exemplary process includes identifying a target group of RRUs, and their cell sectors, for configuration/reconfiguration (block 600). A geographic map of mobile network 110, that keeps track of the disposition of, and the inventory of installed equipment of, RRUs throughout the network may be consulted to identify the target group of RRUs. Identifying the target group of RRUs may include identifying geographical regions with densely populated RRUs (e.g., dense urban or dense suburban areas) based on consultation of the geographical map of mobile network 110.

Existing RF signal coverage boundaries of cell sectors within the identified target group are determined (block 610). Existing techniques, such as RF propagation analysis, cell sector performance reports, and/or user equipment data collection tools may be used to identify the existing RF signal coverage boundaries of the cell sectors within the target group of RRUs identified in block 600. The existing RF signal coverage boundaries may be stored in memory (e.g., at cell sector clusterer 120) for retrieval and use in block 610.

Performance parameters associated with each of the cell sectors are determined (block 620). Various different performance parameters associated with each of the cell sectors of the RRUs within the identified target group may be collected and stored. For example, CRAN BBU hub 135, the RRUs of CRAN 125, and/or UPF 140 of core network 130 may measure different performance parameters associated with each of the cell sectors, such as, for example, a handoff occurrence rate between cell sectors in the target group (e.g., number of handoffs between pairs of cell sectors in the target group), average throughput, latency, delay, jitter, bandwidth, reliability, and errors (e.g., data loss errors). Other types of cell sector performance parameters, not described herein, may be obtained for use in the exemplary process of FIG. 6. The measured performance parameters may be reported to a node within mobile network 110 for collection and storage as a history of measured performance parameters. In one implementation, the measured performance parameters may be reported to cell sector clusterer 120 for storage in memory and for subsequent retrieval.

Figure 7:
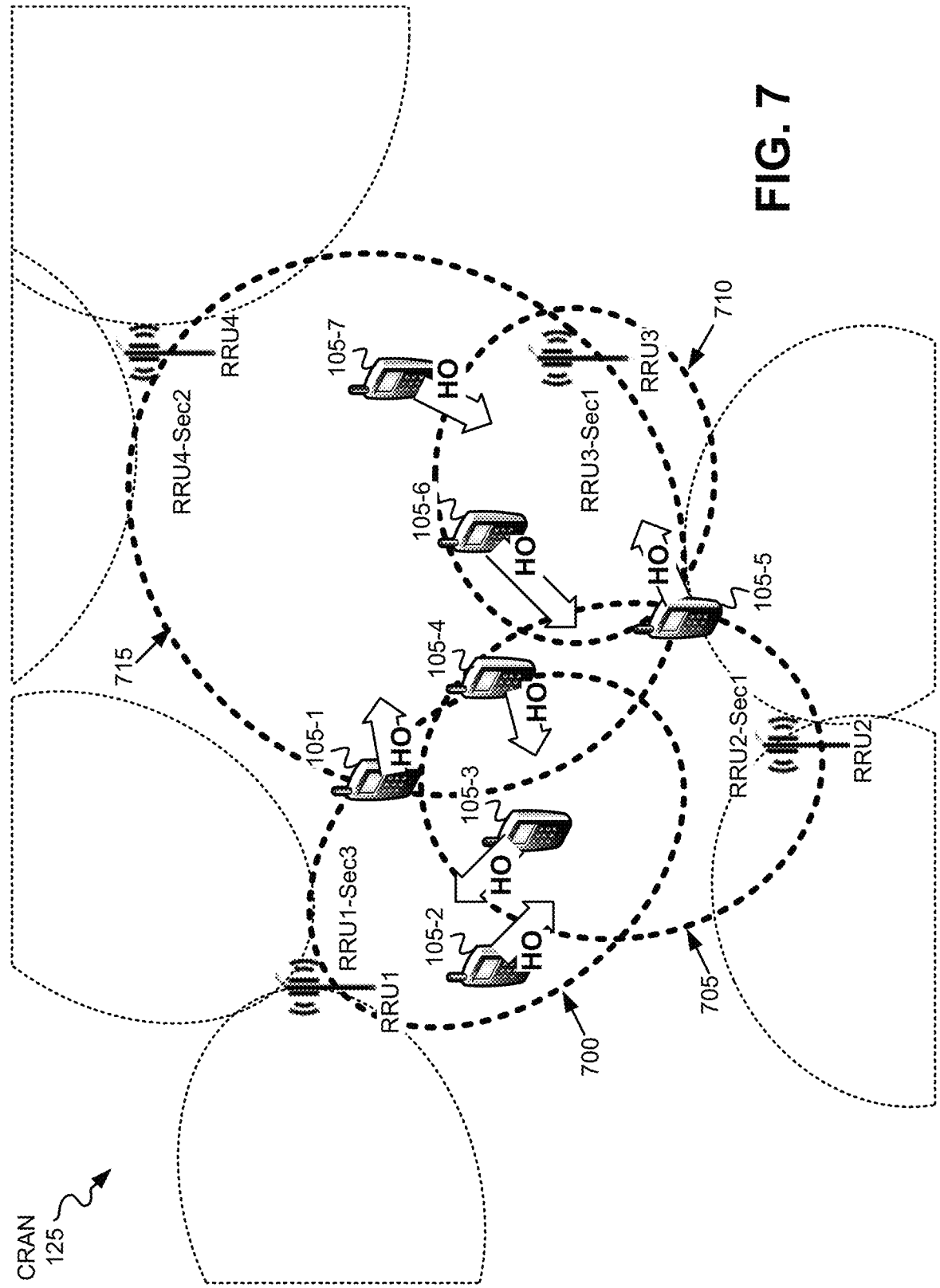
FIG. 7 depicts examples of various User Equipment devices traversing between cell sectors within the CRAN of FIG. 2.

FIG. 7 depicts examples of various UEs 105 traversing cell sectors within the exemplary CRAN 125 described above with respect to FIG. 2. As shown in FIG. 7, a hand-off (HO) occurs between RRU1 sector 3 (RRU1-Sec3) 700 and RRU4 sector 2 (RRU4-Sec2) 715 as UE 105-1 travels between those two cell sectors 700 and 715. A HO further occurs between RRU1-Sec3 600 and RRU2 sector 1 (RRU2-Sec1) 705 as UE 105-2 travels between those two cell sectors 700 and 705. A HO also occurs between RRU2-Sec1 605 and RRU1-Sec3) 700 as UE 105-3 travels between those two cell sectors. A HO occurs between RRU2-Sec1 705 and RRU1-Sec3) 700 as UE 105-4 travels between those two cell sectors 705 and 700. A HO occurs between RRU2-Sec1 705 and RRU3 sector 1 (RRU3-Sec1) 710 as UE 105-5 travels between those two cell sectors 705 and 710. A HO occurs between RRU3-Sec1 610 and RRU2-Sec1 705 as UE 105-6 travels between those two cell sectors 710 and 705. A HO occurs between RRU4-Sec2 715 and RRU3-Sec1 710 as UE 105-7 travels between those two cell sectors 715 and 710. At the occurrence of each HO, the RRU of the cell sector to which the UE is handed off may update the handoff occurrence rate for UE handoffs from the particular source cell sector to the HO target cell sector. As the handoff occurrence rate is updated at each RRU for handoffs of UEs made to cell sectors of that RRU, the RRU may continuously or periodically report the handoff occurrence rate to cell sector clusterer 120.

Cell sectors in the target group are identified as candidates for inclusion in a cell sector cluster based on cell sector handover interactions (block 630). For example, HO occurrence rates between cell sectors of the RRUs of CRAN 125 within the target group of RRUs may be analyzed to identify cell sectors that have higher rates of handover interactions between one another than other cell sectors within the target group. For example, referring back to FIG. 2, high handover occurrence rates may occur between sector 1 of RRU3 and sector 2 of RRU4, between sector 1 of RRU3 and sector 3 of RRU1, between sector 1 of RRU3 and sector 1 of RRU2, and between sector 1 of RRU3 and sector 2 of RRU2. These sectors may, thus, be identified as candidates for inclusion in a cell sector cluster. In this example, the cell sector cluster candidates include sector 1 of RRU3, sector 2 of RRU4, sector 3 of RRU1, sector 1 of RRU2, and sector 2 of RRU2.

Cell sectors, among the cell sector candidates of block 630, that are to be included in the cell sector cluster are determined (block 640). Determination of which cell sector candidates are to be included in the cell sector cluster may be based on various factors, such as, for example, one or more of: 1) RF signal coverage boundaries of each of the cell sector candidates (e.g., from block 610); 2) performance parameters of each of the cell sector candidates (e.g., from block 620); 3) capacity limitations of the BBU(s) of BBU hub 135; or 4) a maximum distance of paths from BBU hub 135 to a furthest cell sector of the cell sector candidates. In other implementations, other factors, not described above, may alternatively or additionally be used for determining a set of cell sectors of the cell sector candidates to include in the cell sector cluster. In an example in which the fronthaul link includes an optical fiber (such as shown in FIG. 1B), a breakdown in optical signal quality may occur if a maximum distance is exceeded between the optical transmitters of the RRU and the BBU. When this maximum distance is exceeded, loss of data, or even a complete loss of the communication link, may occur. This occurrence reduces, or eliminates entirely, the capacity supplied by the RRU and BBU, causing an increase in capacity demand on adjacent cell sectors. The negative capacity impact of exceeding a maximum distance for the BBU-to-RRU optical fiber link leads to dropped/lost calls, ineffective network connection attempts, increased latency (e.g., resulting in choppy audio/video), and loss of service. Therefore, selection of the cell sectors to include in a particular cell sector cluster should take into account an optical fiber distance between the RRU of each cell sector and the BBU to which the fronthaul link is connected. Cell sectors of RRUs having optical fiber distances exceeding a maximum distance with the servicing BBU should be excluded from inclusion in a particular cell sector cluster that is to be serviced by the BBU.

The determined cell sectors are clustered in the cell sector cluster by assigning a same base station ID to each of the determined cell sectors (block 650). The set of multiple cell sectors identified in block 640 may be assigned a same base station ID (e.g., gNB ID) to indicate that they are all part of a same cell sector cluster, possibly in spite of at least some of the cell sectors being associated with different RRUs of CRAN 125. For each cell sector clustered in the cell sector cluster, an entry 505 of data structure 500 for that cell sector (i.e., identified by the cell sector ID in field 515) may have the assigned base station ID stored in field 530.

In the example of block 630 above, described with respect to FIG. 2, sector 1 of RRU3, sector 2 of RRU4, sector 3 of RRU1, and sector 1 of RRU2 of the cell sector cluster candidates are identified for clustering together. A same gNB ID (e.g., "gNB ID #1) is then assigned to all of the cell sectors (e.g., sector 1 of RRU3, sector 2 of RRU4, sector 3 of RRU1, and sector 1 of RRU2) to have them belong to the same cell sector cluster.

Figure 8:
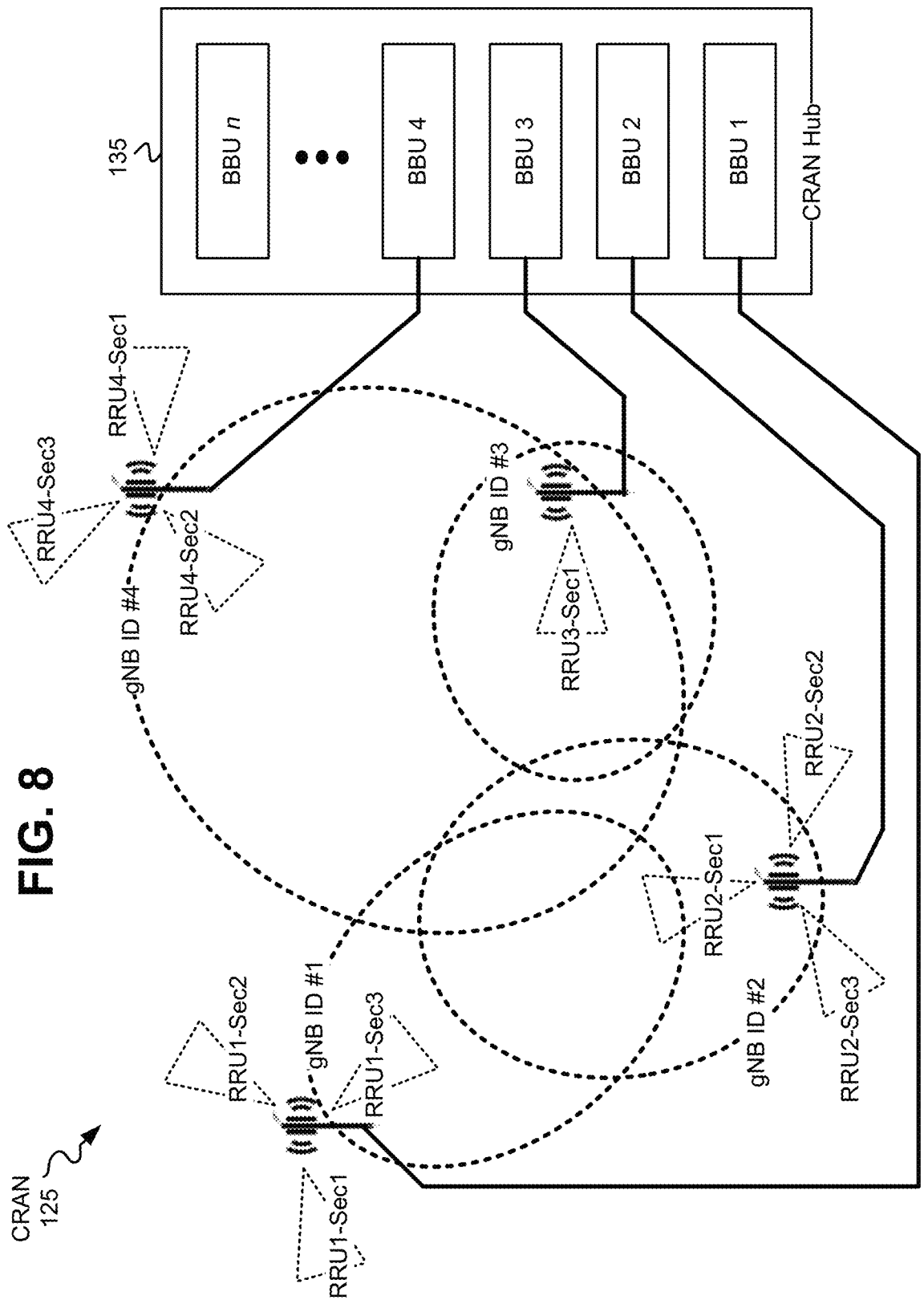
FIGS. 8 and 9 illustrate an example of the clustering of cell sectors and assignment of a same gNodeB identifier to the clustered cell sectors regardless of which RRU with which the cell sectors are associated.

FIG. 8 illustrates an example of an initial state, prior to execution of blocks 600-650 of FIG. 6, in which all of the sectors of each RRU are assigned a same gNB ID. For example, RRU1-Sec1, RRU1-Sec2, and RRU1-Sec3 are assigned to gNB ID #1; RRU2-Sec1, RRU2-Sec2, and RRU2-Sec3 are assigned to gNB ID #2; RRU3-Sec1, RRU3-Sec2, RRU3-Sec3 are assigned to gNB ID #3; and RRU4-Sec1, RRU4-Sec2, and RRU4-Sec3 are assigned to gNB ID #4. In the example of FIG. 8, prior to execution of blocks 600-650, gNB ID #1 corresponds to BBU1 and the cell sectors of RRU1, gNB ID #2 corresponds to BBU2 and the cell sectors of RRU2, gNB ID #3 corresponds to BBU3 and the cell sectors of RRU3, and gNB ID #4 corresponds to BBU4 and the cell sectors of RRU 4.

Figure 9:
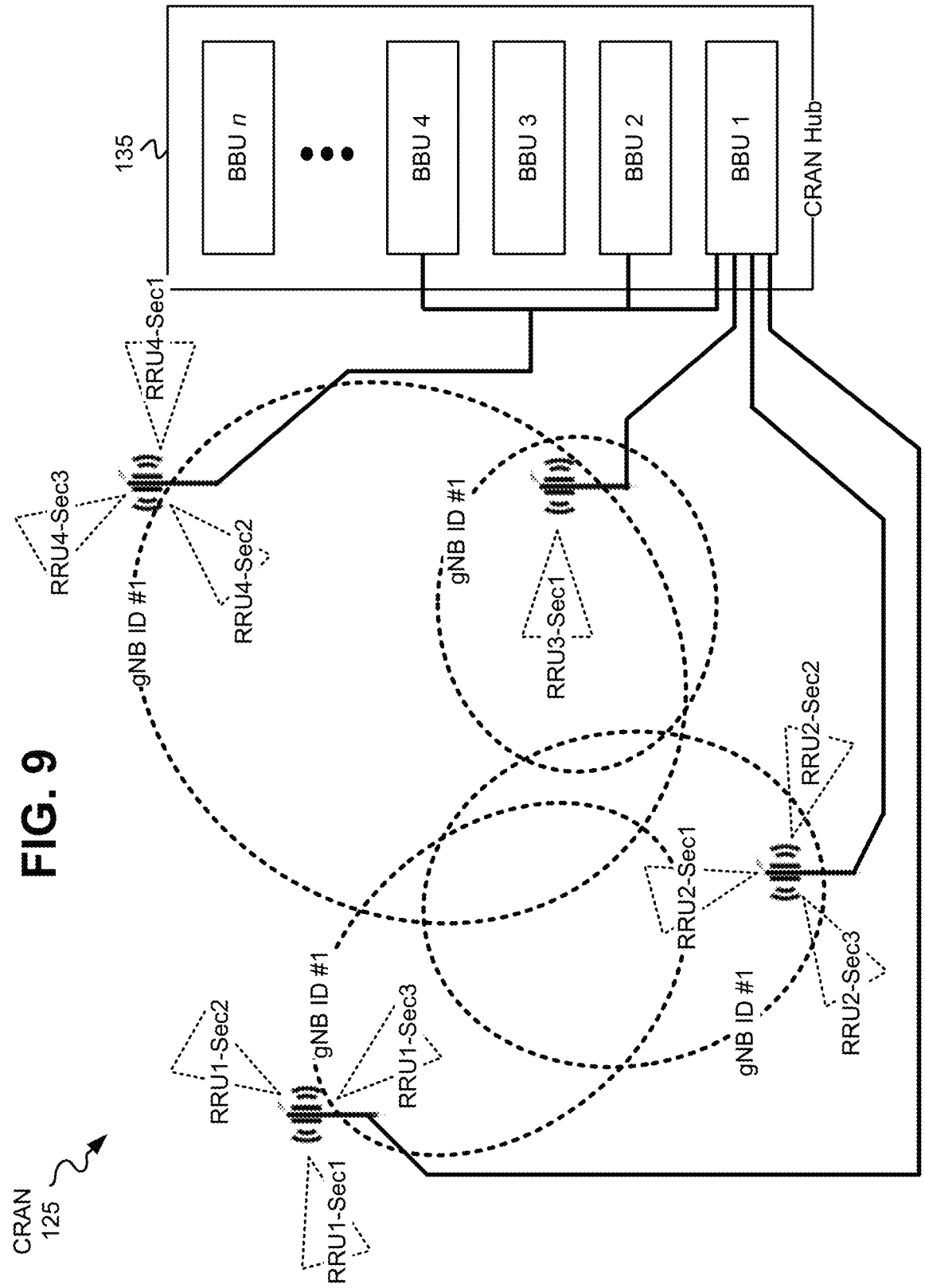

FIG. 9 illustrates an example of the clustering of cell sectors, subsequent to execution of blocks 600-650 of FIG. 6 and assignment of a same gNB ID to the clustered cell sectors regardless of which RRU the cell sectors are associated. In the example of FIG. 9, the cell sector cluster that includes sector 1 of RRU3, sector 2 of RRU4, sector 3 of RRU1, and sector 1 of RRU2 are assigned a same gNB ID (e.g., gNB ID #1). The other cell sectors of RRU1, RRU2, RRU3, and RRU4 (e.g., RRU1-Sec1, RRU1-Sec2, RRU2-Sec2, RRU2-Sec3, RRU4-Sec1, and RRU4-Sec3) may be assigned to other gNB IDs (other than gNB #1) based on the clustering of blocks 600-650.

Connections between RRU cell sectors and the ports of the BBUs of the BBU hub 135 are configured/reconfigured based on the assigned base station IDs (block 660). In the exemplary implementation of FIG. 2, in which switch 200 is used to configure/reconfigure the interconnections between the cell sectors of the RRUs and the BBUs of BBU hub 135, switch 200 may selectively switch each cell sector of each RRU to a particular BBU of BBU hub 135. Switch 200, thus, reconfigures the interconnections between cell sectors of the RRUs and ports of the BBUs of BBU hub 135. Alternatively, the interconnections between each of the cell sectors of the RRUs and the ports of the BBUs of BBU hub 135 may be manually reconfigured based on the assigned base station IDs. For each RRU cell sector involved in the connection configuring/reconfiguring, an entry 505 of data structure 500 for that cell sector (i.e., identified by the cell sector ID in field 515) may have the BBU ID in field 520 and the BBU port ID in field 525 changes to reflect the newly configured/reconfigured interconnections between the RRU cell sector and a particular port of a particular BBU of BBU hub 135.

FIG. 9 further illustrates the cell sectors of RRU4 and their interconnections with the BBUs of BBU hub 135. RRU4-Sec2, as a member of the clustered cell sector assigned gNB ID #1, is interconnected with BBU1 of BBU hub 135 (e.g., via switch 200). RRU4-Sec1 is interconnected with BBU2 of BBU hub 135 (e.g., via switch 200), and RRU4-Sec3 is interconnected with BBU 4 of BBU hub 135 (e.g., via switch 200). Though not shown in FIG. 9, cell sectors RRU1-Sec1 and RRU1-Sec2 may interconnect with a BBU5 (not shown) of BBU hub 135 (e.g., via switch 200), and cell sectors RRU2-Sec3 and RRU2-Sec2 may interconnect with a BBU6 (not shown) of BBU hub 135 (e.g., via switch 200).

The internal routing of the BBUs of the CRAN BBU hub 135 is configured/reconfigured based on the configured/reconfigured connections and the assigned base station IDs (block 670). The internal routing of traffic within the CRAN BBUs may be modified to map the ports of each the BBUs within BBU hub 135 to target cell sectors, including target cell sectors clustered as a single base station ID (e.g., gNB ID). Referring again to the example of FIG. 9, internal routing of BBU1 may map a first port to RRU1-Sec3, a second port to RRU2-Sec1, a third port to RRU3-Sec1, and a fourth port to RRU4-Sec2. Thus, the internal routing of BBU1 maps ports to all of the cell sectors of the cell sector cluster associated with gNB #1. When traffic is received at BBU1 for the destination target cell sector RRU2-Sec1, then BBU1 sends the traffic out the port that is mapped to RRU2-Sec1. When traffic is received at BBU1 for the destination target cell sector RRU3-Sec1, the BBU1 sends the traffic out the port that is mapped to RRU3-Sec1.

Blocks 610-670 of the exemplary process of FIG. 6 may be repeated (e.g., in parallel or sequential execution) to generate multiple cell sector clusters, with each cell sector cluster being assigned a particular base station ID and the connections between the RRU cell sectors of each cell sector cluster and the ports of respective BBUs of the CRAN hub being reconfigured.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 6, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 420) of a device. A non-transitory storage medium includes one or more of the storage mediums described in relation to memory 430. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
measuring performance parameters associated with multiple cell sectors of a group of multiple Remote Radio Units (RRUs), wherein the performance parameters include cell handover parameters associated with handovers involving the multiple cell sectors;
determining a first set of cell sectors of the multiple cell sectors to include in a first cell sector cluster based on the measured performance parameters, wherein determining the first set of cell sectors to include in the first cell sector cluster further comprises:
identifying, based on the cell handover parameters, cell sectors, of the multiple cell sectors, having a higher percentage of handoff interactions between other cell sectors of the multiple cell sectors; and
clustering the identified cell sectors in the first cell sector cluster, wherein the identified cell sectors comprise the first set of cell sectors; and
configuring connections, between the first set of cell sectors included in the first cell sector cluster and a first Baseband Unit (BBU) of multiple BBUs of a Centralized Radio Access Network (CRAN) hub, such that the first BBU processes traffic to and from the first set of cell sectors included in the first cell sector cluster.

2. The method of claim 1, wherein the group of multiple RRUs includes a first RRU and a second RRU, wherein the first RRU includes a first cell sector and the second RRU includes a second cell sector, and wherein the first set of cell sectors comprises the first cell sector and the second cell sector.

3. The method of claim 1, wherein a first RRU of the group of multiple RRUs includes at least a first cell sector and a second cell sector and wherein a second RRU includes at least a first cell sector and a second cell sector, and wherein configuring the connections comprises:
configuring connections between the first cell sector of the first RRU and the first cell sector of the second RRU such that the first BBU processes traffic to and from the first cell sector of the first RRU and the first cell sector of the second RRU; and
configuring connections between the second cell sector of the first RRU and the second cell sector of the second RRU such that at least one second BBU of the CRAN hub processes the traffic to and from the second cell sector of the first RRU and the second cell sector of the sector RRU.

4. The method of claim 1, further comprising:
performing at least one of:
determining radio frequency (RF) signal coverage boundaries of the multiple cell sectors associated with the group of RRUs;
determining capacity limitations of each of the multiple BBUs of the CRAN hub; or
determining a maximum distance of paths from the CRAN hub to a furthest cell sector of the multiple cell sectors,
wherein the determining the first set of cell sectors of the multiple cell sectors to include in the first cell sector cluster is further based on at least one of the determined RF signal coverage boundaries, the determined capacity limitations, or the determined maximum distance of paths.

5. The method of claim 1, wherein configuring the connections between the first set of cell sectors and the first BBU of the multiple BBUs of the CRAN hub further comprises:
selectively switching each cell sector of the first set of cell sectors to connect to the first BBU.

6. The method of claim 5, wherein selectively switching each cell sector further comprises:
using a Reconfigurable Optical Add-Drop Multiplexer (ROADM) to switch each cell sector of the first set of cell sectors to connect to the first BBU.

7. The method of claim 1, wherein configuring the connections further comprises:
configuring connections between the first set of cell sectors included in the first cell sector cluster and one or more ports of the first BBU of the multiple BBUs of the CRAN hub.

8. The method of claim 7, further comprising:
configuring internal routing of the first BBU based on the configured connections.

9. A device, comprising:
a communication interface coupled to a mobile network; and
a processor configured to:
receive, via the communication interface, performance parameter measurements associated with multiple cell sectors of a group of multiple Remote Radio Units (RRUs), wherein the performance parameters include cell handover parameters associated with handovers involving the multiple cell sectors;
determine a first set of cell sectors of the multiple cell sectors to include in a first cell sector cluster based on the measured performance parameters, wherein, when determining the first set of cell sectors to include in the first cell sector cluster, the processor is further configured to:
identify, based on the cell handover parameters, cell sectors, of the multiple cell sectors, having a higher percentage of handoff interactions between other cell sectors of the multiple cell sectors, and
cluster the identified cell sectors in the first cell sector cluster, wherein the identified cell sectors comprise the first set of cell sectors; and
cause connections to be configured, between the first set of cell sectors included in the first cell sector cluster and a first Baseband Unit (BBU) of multiple BBUs of a Centralized Radio Access Network (CRAN) hub, such that the first BBU processes traffic to and from the first set of cell sectors included in the first cell sector cluster.

10. The device of claim 9, wherein the group of multiple RRUs includes a first RRU and a second RRU, wherein the first RRU includes a first cell sector and the second RRU includes a second cell sector, and wherein the first set of cell sectors comprises the first cell sector and the second cell sector.

11. The device of claim 9, wherein a first RRU of the group of multiple RRUs includes at least a first cell sector and a second cell sector and wherein a second RRU includes at least a first cell sector and a second cell sector, and wherein, when causing the connections to be configured, the processor is further configured to:
cause connections between the first cell sector of the first RRU and the first cell sector of the second RRU to be configured such that the first BBU processes traffic to and from the first cell sector of the first RRU and the first cell sector of the second RRU; and
cause connections between the second cell sector of the first RRU and the second cell sector of the second RRU to be configured such that at least one second BBU of the CRAN hub processes the traffic to and from the second cell sector of the first RRU and the second cell sector of the sector RRU.

12. The device of claim 9, wherein the processor is further configured to:
perform at least one of:
  determine radio frequency (RF) signal coverage boundaries of the multiple cell sectors associated with the group of RRUs,
  determine capacity limitations of each of the multiple BBUs of the CRAN hub, or
  determine a maximum distance of paths from the CRAN hub to a furthest cell sector of the multiple cell sectors,
wherein, when the processor determines the first set of cell sectors of the multiple cell sectors to include in the first cell sector cluster, the processor is further configured to:
  determine the first set of cell sectors of the multiple cell sectors further based on at least one of the determined RF signal coverage boundaries, the determined capacity limitations, or the determined maximum distance of paths.

13. The device of claim 9, wherein, when causing the connections to be configured between the first set of cell sectors and the first BBU of the multiple BBUs of the CRAN hub, the processor is further configured to:
  cause a switch to selectively switch each cell sector of the first set of cell sectors to connect to the first BBU.

14. The device of claim 9, wherein, when configuring the connections, the processor is further configured to:
  configure connections between the first set of cell sectors included in the first cell sector cluster and one or more ports of the first BBU of the multiple BBUs of the CRAN hub.

15. The method of claim 14, wherein the processor is further configured to:
  configure internal routing of the first BBU based on the configured connections.

16. A non-transitory storage medium storing instructions executable by a device, wherein the instructions comprise instructions to cause the device to:
  receive performance parameter measurements associated with multiple cell sectors of a group of multiple Remote Radio Units (RRUs);
  determine radio frequency (RF) signal coverage boundaries of the multiple cell sectors associated with the group of RRUs;
  determine capacity limitations of each of the multiple BBUs of the CRAN hub;
  determine a maximum distance of paths from the CRAN hub to a furthest cell sector of the multiple cell sectors;
  determine a first set of cell sectors of the multiple cell sectors to include in a first cell sector cluster based on the measured performance parameters; and
  cause connections to be configured, between the first set of cell sectors included in the first cell sector cluster and a first Baseband Unit (BBU) of multiple BBUs of a Centralized Radio Access Network (CRAN) hub, such that the first BBU processes traffic to and from the first set of cell sectors included in the first cell sector cluster.

17. The non-transitory storage medium of claim 16, wherein the group of multiple RRUs includes a first RRU and a second RRU, wherein the first RRU includes a first cell sector and the second RRU includes a second cell sector, and wherein the first set of cell sectors comprises the first cell sector and the second cell sector.

18. The non-transitory storage medium of claim 16, wherein the performance parameters include cell handover parameters associated with handovers involving the multiple cell sectors, or average throughput, latency, delay, jitter, bandwidth, reliability or data loss error parameters associated with each of the multiple cell sectors.

19. The non-transitory storage medium of claim 16, wherein when the device determines the first set of cell sectors of the multiple cell sectors to include in the first cell sector cluster, the device determines the first set of cell sectors of the multiple cell sectors further based on the determined RF signal coverage boundaries, the determined capacity limitations, and the determined maximum distance of paths.

20. The method of claim 16, wherein a first RRU of the group of multiple RRUs includes at least a first cell sector and a second cell sector and wherein a second RRU includes at least a first cell sector and a second cell sector, and wherein the instructions further comprise instructions to cause the device to:
  cause connections, between the first cell sector of the first RRU and the first cell sector of the second RRU, to be configured such that the first BBU processes traffic to and from the first cell sector of the first RRU and the first cell sector of the second RRU; and
  cause connections, between the second cell sector of the first RRU and the second cell sector of the second RRU, to be configured such that at least one second BBU of the CRAN hub processes the traffic to and from the second cell sector of the first RRU and the second cell sector of the sector RRU.

* * * * *